Jan. 31, 1961

O. M. WHITTEN 2,969,807

METERING VALVE CONSTRUCTION

Filed Feb. 21, 1955

INVENTOR.
Owen M. Whitten.
BY

Jan. 31, 1961

O. M. WHITTEN 2,969,807

METERING VALVE CONSTRUCTION

Filed Feb. 21, 1955

INVENTOR.
Owen M. Whitten.
BY

_United States Patent Office_

2,969,807
Patented Jan. 31, 1961

2,969,807

METERING VALVE CONSTRUCTION

Owen M. Whitten, Mesquite, Tex., assignor to Kelsey-Hayes Company, a corporation of Delaware Filed Feb. 21, 1955, Ser. No. 489,487

1 Claim. (Cl. 137—620)

The invention relates to valve constructions and refers more particularly to valve constructions for use in booster devices.

The invention has for one of its objects to provide a valve construction for metering the flow of a fluid medium.

The invention has for another object to provide a valve construction which is constructed to meter the flow of air to a booster device to make the booster device operate smoothly.

With these and other objects in view the invention resides in the novel features of construction as more fully hereinafter described.

Figure 1:
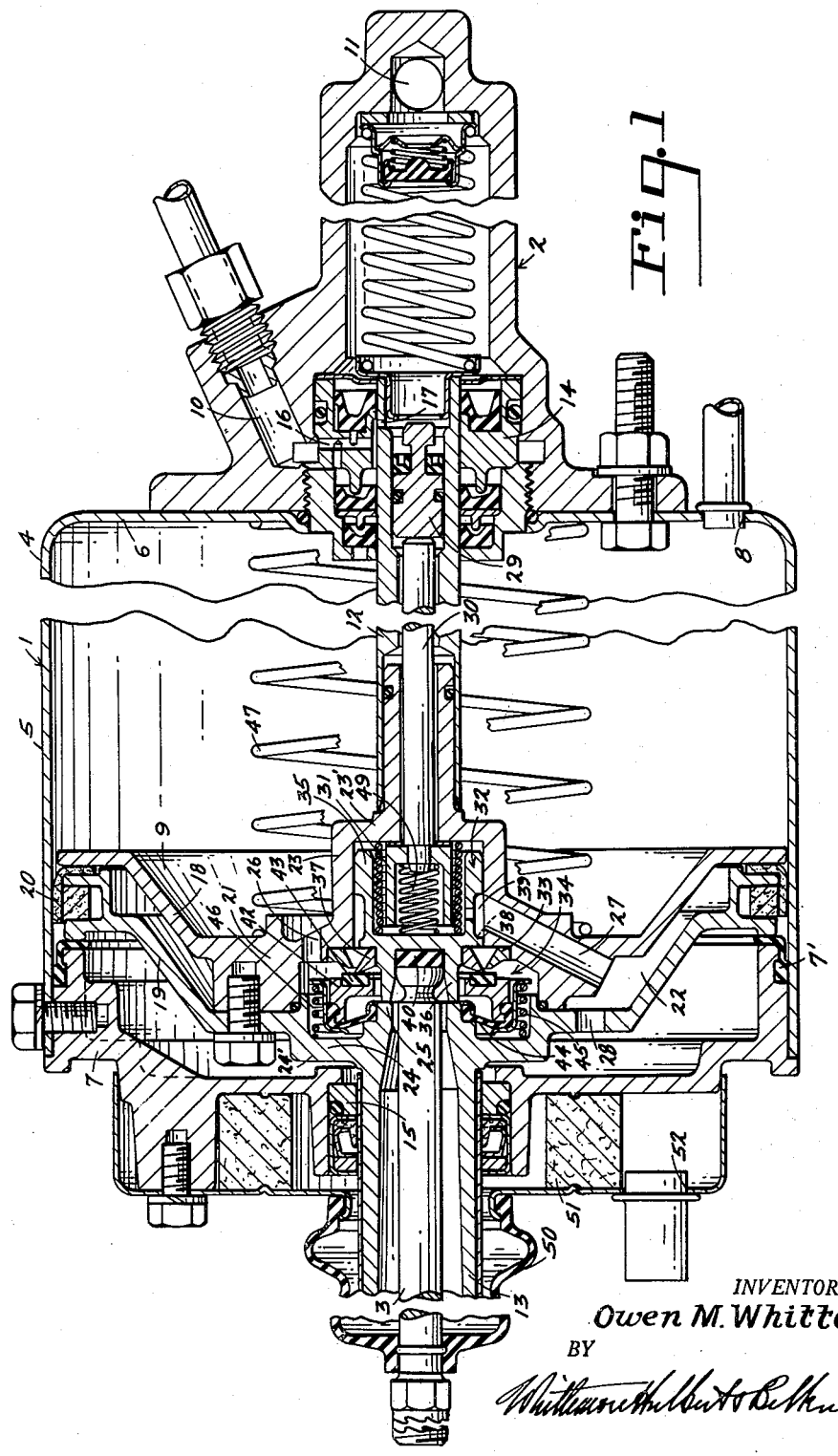
Figure 1 is a sectional view of a booster device having a valve construction embodying the invention and showing the parts in unapplied position.

The valve construction is particularly designed for use in booster devices for applying hydraulic brakes of motor vehicles and, as shown in Figure 1, the booster device comprises the booster 1, the hydraulic cylinder 2, and the manually operable push rod 3 which is connected to a foot pedal in a usual manner.

The booster has the casing 4 formed with the cylindrical side wall 5, the integral front end wall 6, and the closure 7 secured to its rear end. The front end wall is provided with a vacuum port 8 which is adapted to be connected to a suitable source of vacuum, such as the intake manifold of an internal combustion engine of a motor vehicle. The booster also has the power piston 9 reciprocable within the casing and forming therewith a vacuum chamber at the front side of the power piston and a variable pressure chamber at the rear side of the power piston. The hydraulic cylinder 2 is secured to the front end wall 6 and has the braking liquid inlet port 10 at its rear end adapted to be connected to a reservoir and the braking liquid outlet port 11 at its front end adapted to be connected to a hydraulic motor such as a wheel cylinder for operating a brake of the motor vehicle.

The power piston has secured thereto the axially aligned tubular power plunger 12 and the tubular stem 13 which respectively extend forwardly and rearwardly from the power piston and slidably engage a bearing 14 at the rear end of the hydraulic cylinder 2 and a bearing 15 in the closure 7. The bearing 14 is provided with a port 16 communicating with the port 10. The power plunger extends into the hydraulic cylinder and has near its front end the port 17 which in the off or retracted position of the power plunger registers with the port 16 and in the operable or extended position is located forwardly of and sealed from this port.

The power piston 9 comprises the front and rear sections 18 and 19 respectively secured intermediate their inner and outer peripheries to each other and retaining between their outer peripheries the sealing ring 20 which slidably engages the side wall 5. The front section 18 has the rearwardly extending annular boss 21 abutting and secured to the rear section 19, the portions of the sections between the boss and the sealing ring retaining portions being axially spaced from each other to provide an air passageway 22. The power piston is formed with a central valve chamber by providing the front section 18 with the central forwardly extending cylindrical hub 23 and by forming the rear section 19 with the rearwardly extending cylindrical hub 24. The hub 23 is connected to the power plunger 12 and the hub 24 is connected to the stem 13 from which the axially aligned annular flange 25 extends forwardly. The hub 23 forms a reduced chamber portion and the hub 24 together with the front section 18 radially inside the annular boss 21 forms an enlarged chamber portion of the central valve chamber. The front section 18 has the axial vacuum passages 26 radially outwardly of the hub 23 placing the enlarged chamber portion in communication with the vacuum chamber at the front side of the power piston 9. The front section 18 also has the generally radially extending air passages 27 leading from the reduced chamber portion to the air passageway 22. The rear section 19 has the axial air passages 28 placing this passageway in communication with the variable pressure chamber at the rear side of the power piston 9.

In addition to the power plunger 12, there is the reaction piston 29 within the power plunger for assisting in creating pressure in the hydraulic cylinder 2. This piston forms part of a reaction device including the reaction rod 30 and the reaction cup 31 for transmitting the hydraulic pressure created in the hydraulic cylinder 2 to the push rod 3 so that the operator may feel the pressure.

Figure 2:
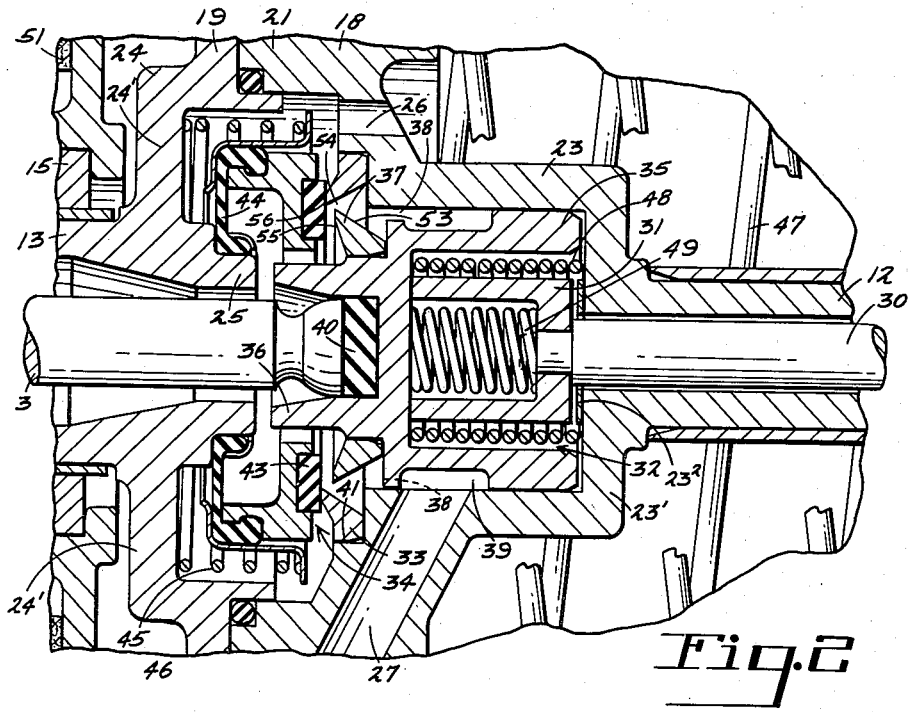
Figure 2 is a similar view of a portion of Figure 1 showing the parts in applied position.

The valve construction for controlling the operation of the booster comprises the air valve member 32, the vacuum valve element 33, and the floating valve member 34. The floating valve member cooperates with the air valve member and the vacuum valve element to form an air valve and a vacuum valve, respectively. The air valve member has the cup-shaped body 35, the annular wall 36 at the rear of the body and the air valve element 37. The body has a cylindrical side wall, the front and rear end portions of which are enlarged and slidably engage the hub 23. The rear end portion has the axial grooves 38 providing air passages to the annular groove 39 between the end portions. The annular wall 36 is adapted to abut the annular flange 25 to limit the rearward movement of the air valve member and the annular wall encircles a suitable sound deadening disk 40 between the air valve member 32 and the push rod 3. The air valve element 37 is a circular ring encircling the annular wall 36 and seated on the rear end of the body 35. The ring has an air-tight engagement with one of the parts, preferably the annular wall. The vacuum valve element 33 is a circular ring radially inside and engaging the annular shoulder 41 of the front section 18 of the power piston (Fig. 2) and seated on a planar rear surface of the front section 18. The latter ring has an air-tight engagement preferably with the annular shoulder. The floating valve member 34 comprises the ring 42 of angle cross section, the annular seal 43 mounted on the radial flange of the ring and the flexible diaphragm 44 secured at its outer edge to the axial flange of the ring and at its inner edge to the annular flange 25, the joints at both edges being air-tight. The seal 43 is formed of a suitable sealing material, such as rubber. The floating valve member is axially urged forwardly toward the air and vacuum valve elements 37 and 33 respectively by the coil spring 45 abutting the radial wall 24' of the hub 24 and a peripheral flange of the cup-shaped member 46 which encircles the ring 42 and abuts its rear end.

A coil spring 47 is adapted to return the power piston 9 to retracted position against the seal 7' between the casing 4 and the closure 7. A coil spring 48 is located between the bottom of the body 35 and the radial wall 23' of the hub 23 for returning the air valve member to its retracted position with the annular wall 36 abutting the annular flange 25. Another coil spring 49 is located between the bottoms of the reaction cup 31 and body 35 for returning the reaction cup to its forward position against a sound deadening disk 23² on the radial wall 23' and also returning the reaction piston 29 and reaction rod 30 to their forward positions and further assisting the coil spring 48 to return the air valve member to its retracted position.

In the retracted positions of the parts, the air valve element 37 is seated on the seal 43 and the vacuum valve element 33 is spaced forward from the seal. As a result, both the vacuum chamber and variable pressure chamber are under sub-atmospheric pressure because they are in communication through the vacuum passages 26, the space between the air and vacuum valve elements 37 and 33, respectively, which space constitutes an air-vacuum passage, the axial grooves 38, the annular groove 39, the air passages 27, the passageway 22 and the air passages 28. Also, the annular space confined by the air valve member 32 and the floating valve member 34 is under atmospheric pressure since the joint between the annular wall 36 and annular flange 25 is not air-tight so that air may pass therethrough from the interior of the tube 13, the space between this tube and the boot 50, the air cleaner 51 and the air inlet port 52. The boot, air cleaner and the air inlet opening are carried by the closure 7.

For the purpose of metering the flow of air to the variable pressure chamber in rear of the power piston 9 so that the flow will gradually increase from zero to a maximum and smooth operation of the booster will be secured, the air and the vacuum valve elements 37 and 33 are provided with the frusto-conical radially inner and radially outer surfaces 53 and 54 respectively. These surfaces diverge forwardly from the annular seats 55 and 56 respectively of the air and vacuum elements, these seats being engageable by the seal 43. The seats have diameters substantially the same as the outer diameter of the body 35 but the seat 56 is of a greater diameter than the seat 55 to provide slight clearance when the air valve element is passing the vacuum valve element.

With this construction of air and vacuum valve elements it will be seen that when the operator moves the push rod 3 forwardly, the air valve member 32 will first be moved forwardly during which time the floating valve member 34 is moved forwardly with the air valve member by reason of its coil spring 45. As the forward movement of the push rod is continued, the seal 43 seats on the vacuum valve element 33 and the air valve element 37 moves away from the seal during which time the cross section of the air passage between the air and vacuum valve elements is gradually increased so that the flow of air through the axial grooves 38, annular groove 39, air passages 27, air passageway 22 and air passages 28 to the variable pressure chamber at the rear side of the power piston 9 gradually increases to secure the desired smooth operation of the booster.

What I claim as my invention is:

A valve construction for metering flow of a fluid medium comprising inner and outer telescoping coaxial valve elements having concentric annular seats on the corresponding ends thereof, the diameter of the seat on said inner valve element being less than the diameter of the seat on said outer valve element to provide clearance upon relative movement of said inner and outer valve elements, a third valve element beyond said ends of said telescoping valve elements engageable with said seats, means supporting said valve elements for relative axial movement, said inner valve element having an annular radially outer surface extending from its seat in one axial direction away from said third valve element, said outer valve element having an annular radially inner surface opposed to said radially outer surface and extending away from its seat in said one axial direction away from said third valve element, said surfaces being concentric and radially spaced apart and cooperating to form an annular passage for flow of a fluid medium, the opposed surfaces of said telescoping valve elements being frusto-conical and tapering from the seats thereof away from each other in said one axial direction to vary the cross-sectional area of said passage when the seat of one of said telescoping valve elements engages said third valve element and the other of said telescoping valve elements moves axially relative thereto.

References Cited in the file of this patent

UNITED STATES PATENTS

| | | |
|---|---|---|
| 2,002,630 | Eckhouse | May 28, 1935 |
| 2,219,119 | Schumann | Oct. 22, 1940 |
| 2,370,582 | Rodway | Feb. 27, 1945 |
| 2,807,239 | Grant | Sept. 24, 1957 |